United States Patent Office 3,140,194
Patented July 7, 1964

3,140,194
METHOD OF ORNAMENTING PREFORMED POLYOLEFIN SUBSTRATES WITH COATING CONTAINING WATER INSOLUBLE PIGMENTS AND RESULTANT ARTICLE
Domenick Donald Gagliardi, 185 Howland Road, East Greenwich, R.I.
No Drawing. Filed Apr. 28, 1961, Ser. No. 106,173
5 Claims. (Cl. 117—15)

This invention relates to the ornamentation of preformed polyolefin materials with water-insoluble pigments. It particularly concerns the pigment coloring and printing of polyolefin fibers, yarns, fabrics, films, and other shaped solid articles.

It is well known that water-insoluble organic and inorganic pigments, whether applied from water dispersions, from solvent solutions, as print pastes and the like, do not adhere well to polyolefin substrates. It is extremely difficult to print on, or to color such substrates, even if adhesives are used in order to fix the pigments to the substrate. Attempts have been made to overcome these difficulties and affix the pigment particles on the fibers or other articles by utilizing resins, adhesives, binders, or the like, to anchor the pigment particles. However, such colorations of the polyolefins can be destroyed rather easily due to removal of the pigment by abrasion, wear, crocking, soaping, dry-cleaning or other end-use environments.

A principal object of this invention is the provision of new processes of coloring and printing polyolefin materials with water-insoluble pigments. Further objects include:

(1) The provision of new processes which make it possible for water-insoluble pigments to be firmly affixed to fibers, films, sheets, rods, and other preformed articles of solid polyolefins.

(2) The provision of preformed articles of solid polyolefins ornamented by coatings of water-insoluble pigments in which the pigments are so firmly affixed to the polymer substrates that the color strongly resists removal by rubbing, solvents, water extractions, or the like.

(3) The provision of new processes for coloring or printing preformed articles of solid polyolefins which can be conducted with equipment generally available using known material handling techniques.

(4) The provision of new methods of adhering water-insoluble pigments to the surfaces of shaped solid polyolefins.

Other objects and further scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

These objects are accomplished according to the present invention through the ornamentation of preformed articles of solid polyolefins by applying coating compositions containing water-insoluble pigment materials to the surface of the polyolefin article, which has been treated with an oleophilic organic compound having a molecular weight between 100 and 800 and which contains a basic nitrogen atom. The application of the amino-oleophilic compound to the surface of the polyolefin article may be accomplished before the coating with the pigment-containing composition or simultaneously therewith. The amino-oleophilic compound may be applied to the polyolefin article as a solution in an organic solvent, as an aqueous dispersion or emulsion or in the vapor, liquid or molten form. The application can be carried out by impregnating, spraying, coating, infusing or in any other suitable fashion. Following application of the amino-oleophilic compound, the article and the applied compound are preferably heated to a temperature below the melting point of the polyolefin, to bring about a more tenacious association of the compound with the plastic substrate, apparently a diffusion of the oleophilic material into the substrate.

The olephilic compounds usable with the invention should have a molecular weight between about 100 and 800 and preferably between about 150 and 600. The compound must contain a basic nitrogen atom which may appear as a primary, secondary or tertiary amine, salt thereof, or as one of the atoms forming the ring structure of a heterocyclic compound. The organic compound must also contain a non-polar hydrocarbon group containing at least six carbon atoms and preferably between about 12 and 18 carbon atoms.

A preferred group of organic nitrogen compounds for use in carrying out the new processes of this invention are those having the formula:

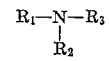

wherein $R_1$ is an alkyl, aryl or cycloalkyl radical containing at least 6 carbon atoms, $R_2$ is a hydrogen, alkyl, aryl, cycloalkyl or alkylene radical, and $R_3$ is a radical selected from the group consisting of $R_5$,

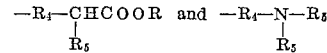

which together with $R_2$ may complete a heterocyclic ring, $R_4$ is a divalent radical selected from the group consisting of alkylene, arylene, cycloalkylene, and polyamino polyalkylene, and $R_5$ is a hydrogen, alkyl, aryl, alkylene or cycloalkyl radical.

$R_4$ is preferably —$CH_2CH_2$—, —$CH_2CH_2CH_2$— or —$CH_2CH_2$—$NH_2CH_2CH_2$—, and $R_5$ is preferably a hydrogen or a 1 to 18 carbon atom alkyl radical.

A two-step procedure of carrying out the new processes involves treatment first with the oleophilic compound, followed by application of the pigment-containing coating composition using conventional systems or techniques of pigment dyeing or printing.

In the case of textile materials, the fabric can be colored by padding through dispersions of organic and inorganic pigments containing the conventional thermoplastic latex binders, followed by drying the material. Alternatively, the treated textile material may be printed with water-in-oil or oil-in-water pigment printing systems utilizing conventional alkyd-amine resin binders. As in all textile pigment dyeing and printing processes, the conventional coloring aids such as wetting agents, leveling agents, thickening agents, anti-crocking agents, crosslinking agents, water repellents, oil repellents, and the like may be employed in the process. In many cases, water and solvent dispersions of pigments without any auxiliary binders may be employed and these show adhesion to the modified polyolefin.

In the case of films and other non-fibrous solid polyolefins, the material may be pretreated as above and then be printed and colored by conventional pigment printing inks.

In a single-step procedure, the basic oleophilic compounds are incorporated in the pigment coloring or printing media and this is applied to unmodified polyolefin structures. Using either procedure, it has been discovered that the application of the oleophilic organic compounds to the polyolefin substrate creates good adhesion of the water-insoluble pigment to the substrate, and good durability against rubbing, solvent and water extraction, or other factors which would serve to remove the pigment from the polyolefin substrate in the absence of the treatment with the oleophilic compound.

The following examples provide data and information on specific operations in accordance with this invention and are given by way of introduction to a more detailed description of the new methods and products. In these examples, and throughout the disclosure, all parts and percentages are by weight unless otherwise specified.

*Example 1*

A sample of fabric woven from yarn formed of twisted polypropylene monofilaments was padded at 60% wet pick-up through a water solution containing:

5 parts of N-hexadecyl propylene diamine
5 parts of acetic acid
½ part of wetting agent
89½ parts of water The impregnated fabric was air dried 30 minutes and then was heated in an oven at 250° F. for 10 minutes.

A sample of untreated polypropylene fabric and one treated as above were padded through a water dispersion containing 1 part of phthalocyanine blue pigment in 99 parts of water. Both samples were dried for 5 minutes at 250° F. One half of each sample was dry cleaned for one hour with perchloroethylene. The pigmented sample of untreated polypropylene lost all its color during the drycleaning test. The second sample which had been pretreated with the N-hexadecyl propylene diamine was substantially unchanged and retained its color during the drycleaning test.

The second half portion of each sample was washed in 0.1% soap and 0.2% sodium carbonate at 120° F. The untreated sample lost over 75% of its color during the wash test. The amine pretreated sample showed substantially no color loss from the wash test.

*Example 2*

A sample of fabric woven from fibers of polyethylene was treated with a water solution containing:

5 parts of rosin amine
2½ parts of lactic acid
2½ parts of chromium acetate
90.00 parts of water The impregnated fabric was dried for 15 minutes at 220° F. It was rinsed in water at 120° F. to remove any non-adherent amine and salt and then dried for 5 minutes at 220° F. A sample of the polyethylene fabric treated as above and a second sample, untreated, were pigment dyed by padding through a dispersion containing:

1 part of chrome oxide green
1½ parts of polyethylacrylate latex
½ parts wetting agent The wet colored samples were dried for 15 minutes at 220° F. One half of each sample was washed and one half was dry cleaned as described in Example 1. In both tests, the pigment dyed samples of untreated polyethylene fabric lost all of their green color. Only slight bleeding was noted in the rosin amine pretreated samples.

*Example 3*

A packaging film of polyethylene was sprayed with a solution containing:

3 parts of N-methyl N-dodecylethylene diamine
97 parts of isopropanol

After spraying, the film was allowed to air dry for one hour. Then it was heated for 25 minutes at 200° F.

This modified sample and an untreated film of polyethylene were printed with a print paste containing 5 parts of a red naphthol pigment dispersed in a water-mineral spirits emulsion containing 5 parts of a styrene-butadiene latex. After drying at 200° F. for 30 minutes, the printed area was subjected to a crocking test by rubbing with cotton cloth. All of the red color rubbed off from the sample of untreated polyethylene film. Only slight color loss was noted in the amine treated film.

*Example 4*

A pad dyeing dispersion was prepared which contained:

I. 2 parts of "Ponsol Brown RBT" Vat Pigment
   2 parts of an ethylacrylate-acrylamide latex
   96 parts of water A second pad dyeing dispersion was prepared which contained:

II. 2 parts of "Ponsol Brown RBT" Vat Pigment
    2 parts of an ethylacrylate-acrylamide latex
    5 parts of N-dodecylpropylene diamine
    2½ parts of glyoxylic acid Both dispersions were applied to a polyethylene fiber and a polypropylene fiber fabric by padding. The samples were air dried and then heated at 230° F. for 10 minutes. All samples were laundered together in a home automatic washing machine using an alkylaryl synthetic detergent. After the laundering, the polyolefin fabrics treated by dispersion I were badly mottled in appearance with areas completely free of color. Those samples pigment dyed with dispersion II containing the amine were still evenly colored, with little or no color loss.

*Example 5*

Pigment dyeing dispersions containing the following ingredients were prepared:

I. 1 part of distearylamine
   1.5 parts carbon black
   3 parts of internally plasticized polyvinylacetate
   1 part of copper acetate
   2 parts of acetic acid
   91.5 parts of water
II. 0.5 part of rosin amine
    5 parts of titanium dioxide
    3 parts of butadiene-acrylonitrile latex
    1 part of gluconic acid
    90.5 parts of water
III. 2.5 parts of N-hydroxyethyl N-octyl propylenediamine
     2.5 parts of iron oxide red pigment
     5 parts of ethylacrylate-acrylic acid latex
     1 part of phosphoric acid
     89 parts of water
IV. 2 parts of octadecylimidazoline
    1 part of benzidine yellow pigment
    1 part of alkyd resin
    1 part of butylated melamine-formaldehyde resin
    0.5 part of emulsifier
    1 part of citric acid
    93.5 parts of water Another series labelled IA, IIA, IIIA and IVA was prepared wherein *all* of the ingredients above were used but the first listed ingredient was left out of each pigment padding mixture. Samples of polypropylene fabric were padded through the eight pigment dispersions and then were flash heated for 3 minutes at 300° F. After drying, one-half of each sample was drycleaned for one hour in perchloroethylene. Another half of each sample was washed at 140° F. with soap. In the case of samples IA, IIA, IIIA and IVA over 50% of the color was removed in drycleaning and wash tests. In the samples I, II, III and IV, little or no color loss occurred in the solvent and wash tests.

Example 6

Samples of polyethylene and polypropylene fabrics which had been treated by the procedure of Example 1 were pigment dyed with a dispersion containing:

3 parts of monastral red pigment
3 parts of stearato chromic chloride
½ part polyvinyl alcohol Samples of untreated polyolefins were also dyed through the above dispersion. After drying for 15 minutes at 230° F., the samples were tested for colorfastness as in Example 1 and for water repellency using the standard spray test. The results are shown below:

| Fabric Sample | Color Fastness | | Water Repellency | |
|---|---|---|---|---|
| | Washed | Dry Cleaned | Washed, Percent | Dry Cleaned, Percent |
| Polyethylene—No Pretreatment. | Poor | Poor | 100 | 0 |
| Polypropylene—No Pretreatment. | ___do_____ | ___do_____ | 100 | 0 |
| Polyethylene—Amine Treated. | Good | Good | 100 | 90 |
| Polypropylene—Amine Treated. | ___do_____ | ___do_____ | 100 | 80 |

Example 7

Samples of polypropylene fabric were treated with a solution containing:

3 parts rosin amine acetate
1 part silicon dioxide pigment dispersion
0.5 part emulsifier
9.5 parts water After padding and drying for 15 minutes at 240° F., the fabric was highly delustered by the silica pigment coating. The delustering effect was retained after washing.

Example 8

Samples of polypropylene fabric were treated by padding through a solution containing 3 parts of N-stearyl diethylene triamine, 3 parts of diglycolic acid, 1 part chrome oxide green pigment, and 93 parts of water. After padding, the fabric samples were air dried for 30 minutes and then were heated 15 minutes at 240° F. Individual pigment dyed samples from above were then after-treated with the following textile finishing compounds. A control sample, pigment dyed with the chrome oxide pigment without the amine, was run for comparison.

After-treatment A: 5% of a silicone resin water-repellent emulsion.
After-treatment B: 5% of a perfluoroacrylate oil repellent latex.
After-treatment C: 5% of stearamidomethylpyridinium chloride water-repellent.
After-treatment D: 5% of methylol stearamide-melamine formaldehyde water-repellent.

The after-treated samples were air dried and then were cured for 15 minutes at 250° F. All samples showed 80–100% water repellency by the Spray Test method. After 5 washes in an automatic washing machine using soap, however, all of the control samples which had not contained the amine in the pigment-dyed pretreatment had lost most of their color and were no longer water-repellent. The poly-propylene samples, pigment dyed with the amine containing solution, retained substantially all of their original depth of shade during the washings and still showed 70–90% water repellency ratings. The set of samples treated with the fluorocarbon resin (B) were still oil repellent after the washings for the case of the amine pigment dyed samples. The control sample, without the amine, showed only initial oil repellency and complete loss of this property and the color after the washings.

Certain specific examples of oleofilic nitrogen compounds useful in carrying out the processes of this invention are reported above. Further specific examples of such compounds include:

Alkyl monoamines:
 Hexylamine
 Dodecylamine
 N-methyl dodecylamine
 Octadecylamine
 N,N-dicarboxypropyl octadecylamine
 Tallowamine
 Hydrogenated tallowamine
 Octadecenylamine
 N-ethyl octadecylamine
 N-carboxypropyl dodecylamine
 Tertiary octylamine
 Dioctadecylamine
 N-carboxymethyl octadecylamine
 N-carboxypropyl N-methyl dodecylamine
 Cocoamine
 Dihexylamine
 N,N-diethyl octadecylamine
 Docosanylamine
 Triacontanylamine
 N-hydroxypropyl octadecylamine
 N-carbethoxy octadecylamine
 N-carboxyphenyl octadecylamine
 N-4-hydroxyphenyl N-methyl octadecylamine Alkyl polyamines:
 N-dodecyl ethylene diamine
 N-dodecyl propylene diamine
 N-octadecyl N'-methyl propylene diamine
 N-octadecyl ethylene diamine
 N-hexyl propylene diamine
 N,N-dioctyl N'-octadecyl propylene diamine
 N-aminopropyl hexadecylamine
 N-carboxypropyl N'-dodecyl propylene diamine
 Docosanyl ethylene diamine
 N-hydroxyethyl N'-dodecyl propylene diamine
 N-dodecyl diethylene triamine
 N-octadecyl tetraethylene pentamine Aryl monoamines:
 N-ethyl aniline
 N-methyl benzylamine
 Naphthylamine
 N-dodecyl aniline
 N-4-diphenyl octylamine
 N-hexyl N-4-hydroxyphenyl aniline
 N-carbethoxy naphthylamine
 N,N-dihexyl aniline
 N-phenyl N-4-chlorophenyl octylamine Aryl polyamines:
 N-phenyl propylene diamine
 N-phenyl N'-dodecyl ethylene diamine
 N-benzyl N-octadecyl diethylene triamine
 N-aminopropyl naphthylamine
 N-carboxypropyl N'-dodecyl N'-phenyl ethylene diamine
 N-docosanyl N'-p-xylyl propylene diamine Cycloalkyl monoamines:
 Cyclohexylamine
 Dicyclohexylamine
 2-octyl cyclohexylamine
 N-dodecyl cyclohexylamine
 N-methoxyoctyl cyclohexylamine
 N-octadecyl-4-methyl cyclohexylamine
 N-octadecyl cyclooctylamine
 Rosin amine
 N-hydroxyethyl rosin amine Cycloalkyl polyamines:
    N-cyclohexyl ethylene diamine
    N-cyclohexyl propylene diamine
    N-cyclohexyl N-octadecyl diethylene triamine
    N-2-methylcyclohexyl N-aminoethyl dodecylamine
    N-cyclohexyl N'-phenyl ethylene diamine
    N-cyclohexyl N-phenylaminoethyl dodecylamine
    N-aminopropyl rosin amine Hetereocyclic compounds:
    1-octadecenyl-3-hydroxyethyl imidazoline
    1-dodecyl imidazoline
    N-dodecyl morpholine
    3-octyl pyrrolidine
    1-hexyldecyl imidazoline
    5-octadecyl pyrimidine
    2,3-dihexyl pyrazine
    2-phenyl-3-dodecyl pyridine
    2-amino 3-dodecyl pyridine
    3-octadecyl piperidine
    3-benzyl 4-amino 5-octyl pyridine
    5-dodecyl 2-pyrazoline
    2,4-dioctyl pyrazine
    2-hexadecyl 3-chloropyridine By the term "oleophilic" as used herein in the definition of the nitrogen containing organic compounds is meant solubility in long chain hydrocarbons and insolubility in water, particularly, a solubility of at least 1 gram in 10 grams of hexane at 70° F. and a solubility in water not exceeding the solubility of hexylamine in water.

The organic compound described above may be applied to the polyolefin material by spraying, impregnation or coating from water dispersions, from solvent solution, from solubilizing systems using the lower organic acids or the zinc, copper, nickel, cobalt and chromium salts of formic and acetic acid, and similar carboxylic acid and by vapor phase treatments.

In order to insure penetration and solution of the compound in the polyolefin fibers it is preferred to age the treated material so as to allow time for diffusion. The aging may be accomplished by several hours storage at room temperature, by elevated temperatures of 100–250° F. in periods of 1 to 120 minutes, preferably 1–15 minutes, depending on the weight of the textile item being treated, or by flash diffusion under pressure or in the presence of supersaturated steam. Temperature ranges from 100° F. to near the softening point, but at least 10° F. below the melting point of the polyolefin are useful. Boiling from suitable solvent solutions of the compounds may also be useful.

There are only general limits to the concentration of compound needed for the treatments prescribed. For example, in a padding method of applying the compound from an acidic water dispersion, good coloration of the polyolefin fibers may be obtained within the limits of from 0.1–5.0% deposited compound. Deposition of 0.5 to 2% of the oleophilic compound is generally sufficient to obtain good coloration. If only light shades are desired, then the lower concentrations of compound are most economical to use. In general, the amount deposited is determined by the depth of share required for a particular type of pigment. It is recommended that the amount of oleophilic compound imbued in the polyolefin be within the limits of 0.01 to 10% by weight of the polyolefin.

The invention is of particular importance for the coloring of fibers and other preformed articles made of solid polymers of olefins having 2–4 carbon atoms, although the new treatments appear to be applicable to all fiber-forming and comparable solid polyolefins. The invention especially concerns polymers of the class that have an inherent viscosity of at least 0.8 and particularly those having an inherent viscosity between about 1.2 and about 10. The term "inherent viscosity" as used herein, means the viscosity of a solution of 0.2 gram of the polymer in 50 cc. of tetralin at 130° C.

Fiber-forming polyethylene and polypropylene are important polyolefins which may be treated by the new operation. These polymers and their various methods of preparation are extensively described in the literature. In addition to these homopolymers of 2–4 carbon atom olefins, copolymers of olefins with other unsaturated hydrocarbons may be satisfactorily treated with the new procedures.

The pigment coating compositions may comprise thermoplastic film forming agents, e.g., vinyl resins, cellulose esters, acrylic ester polymers or the like or thermosetting resins, e.g., phenolic resins, aminoplasts or similar film forming agents known to be useful in coating compositions.

The new treatments make possible the coloration of the treated polyolefin with water-insoluble, non-ionic pigments which normally do not adhere to the polyolefin surface. Examples of such pigments include non-reduced vat dyes, phthalocyanines, benzidines, chrome oxides, iron oxides, aluminum oxide, silica, carbon black, coupled naphthols, titanium oxide, cobalt salts and the like. The specified oleophilic organic materials may be used as the sole binding agents for the pigments or they may be used with conventional binders to improve the adhesion to the polyolefin. The binding of water-insoluble pigments to polyolefin fiber and films has utility in the use of printing inks, labeling and production of decorative effects.

This application is a continuation-in-part of copending application S.N. 91,639, filed February 27, 1961, now U.S. Patent No. 3,098,692, for "Treatment and Coloring of Polyolefins."

Having provided a complete description of the invention in such manner as to distinguish it from other inventions and from what is old, and having provided a description of the best mode contemplated of carrying out the invention, the scope of patent protection to be granted the invention is defined by the following claims.

I claim:

1. A process of ornamenting films of polyethylene which comprises applying a solution of N-dodecylethylene N-methyl diamine in isopropanol to a surface of a polyethylene film, drying the film to evaporate said isopropanol and leave as residue said diamine, the application of said solution being controlled to provide a residue of about 1 to 5% by weight based upon the weight of the film, then heating the treated film to a temperature of about 150 to 200° F. for about 5 to 30 minutes, printing the diamine treated surface of the film with a print paste containing a water-insoluble pigment and a thermoplastic film forming agent and then drying the printed film.

2. A process of decorating fabric formed of polypropylene fibers which comprises padding a polypropylene fiber fabric through a water solution containing about 5 to 10% by weight of the acetic acid salt of a 12 to 18 carbon atom N-alkyl alkylene diamine, the padding being preformed to give a wet pick-up of between about 50 and 100%, drying the fabric, heating the dried fabric about 5 to 30 minutes to a temperature of about 200 to 250° F., then padding the resulting fabric through a coating composition containing about 1 to 10% by weight of a water-insoluble pigment to give a wet pick-up of about 50 to 100% and thereafter drying the fabric.

3. A process for ornamenting preformed articles of solid olefin polymers which comprises applying to the surface of a preformed article of solid olefin polymer an oleophilic organic compound having a molecular weight between about 100 and 800 containing a basic nitrogen atom, setting the applied oleophilic organic compound upon the article surface by heating the article with the said compound applied thereto to a temperature between about 100° F. and 10° F. below the melting point of said solid olefin polymer for between about five to thirty minutes, and then coating the resulting treated surface of the article with a coating composition which contains a water-insoluble pigment.

4. A process for ornamenting films of solid olefin polymers which comprises applying to the surface of a film of solid olefin polymer an N-aminoalkyl alkylamine which comprises an alkyl radical containing between 12 and 18 carbon atoms, setting said amine upon the film surface by heating to a temperature between about 100° F. and 10° F. below the melting point of said solid olefin polymer and then coating the film with a coating composition which contains a water-insoluble pigment, the operation being characterized by the fact that the coating composition is retained upon the surface of said film more tenaciously than such coating composition would be retained upon the untreated film.

5. An ornamented article of solid olefin polymer having a surface thereof imbued with between about 0.01 to 10% by weight of the polyolefin of an oleophilic organic compound having a molecular weight between about 100 and 800 containing a basic nitrogen atom and a hydrocarbon radical containing at least six carbon atoms, said surface bearing a coating composition comprising a water-insoluble pigment which adheres to said surface more tenaciously than it would in the absence of said imbued oleophilic organic compound.

References Cited in the file of this patent

UNITED STATES PATENTS

| | | |
|---|---|---|
| 2,267,205 | Kyrides | Dec. 23, 1941 |
| 2,786,780 | Walles et al. | Mar. 26, 1957 |
| 2,899,262 | Stanton et al. | Aug. 11, 1959 |
| 2,904,447 | Hochuli et al. | Sept. 15, 1959 |
| 2,928,712 | Bradshaw | Mar. 15, 1960 |